United States Patent [19]

Harris

[11] 4,419,822
[45] Dec. 13, 1983

[54] BUMP-FEED TRIMMER
[75] Inventor: David Harris, Wolsingham, England
[73] Assignee: Black & Decker Inc., Newark, Del.
[21] Appl. No.: 338,838
[22] Filed: Jan. 12, 1982
[30] Foreign Application Priority Data
Jan. 14, 1981 [GB] United Kingdom ............... 8101099
[51] Int. Cl.³ .............................................. B26D 1/12
[52] U.S. Cl. ..................................... 30/276; 56/12.7
[58] Field of Search .................... 30/276, 347; 56/12.7
[56] References Cited
U.S. PATENT DOCUMENTS

| 4,183,138 | 1/1980 | Mitchell. | |
|---|---|---|---|
| 4,189,830 | 2/1980 | Pittinger. | |
| 4,203,212 | 5/1980 | Proulx | 30/276 |
| 4,274,201 | 6/1981 | Oberg et al. | 30/276 |

FOREIGN PATENT DOCUMENTS 2856711 7/1980 Fed. Rep. of Germany.
1574382 9/1980 United Kingdom.

Primary Examiner—James M. Meister
Assistant Examiner—Douglas D. Watts
Attorney, Agent, or Firm—Harold Weinstein; Edward D. Murphy; Walter Ottesen

[57] ABSTRACT

A bump-feed monofilament string trimmer has a sleeve-like escapement member (52) axially slidable on a drive member (42) and nested in a spool member (66) which holds a coil (71) of cutting filament. Axially downwardly extending fingers (84) of the escapement member (52) engage in window-like slots (92) in a downwardly extending dome-like protrusion (16) of the spool member (66) to prevent relative rotation between the two members (52,66). The fingers (84) have external screw threaded portions (86) which extend through the slots (92) and are engaged by a nut (18) which releasably secures the spool member (66) to the escapement member (52). The driving member has teeth (88) which normally drivingly engage with an upper series of internal clutch teeth (58) of the escapement member, and temporarily engage with a lower series of clutch teeth (102, 104) when the dome-like protrusion (16) is "bumped" on the ground, whereby discrete lengths of cutting filament are let out from the spool member (66).

17 Claims, 11 Drawing Figures

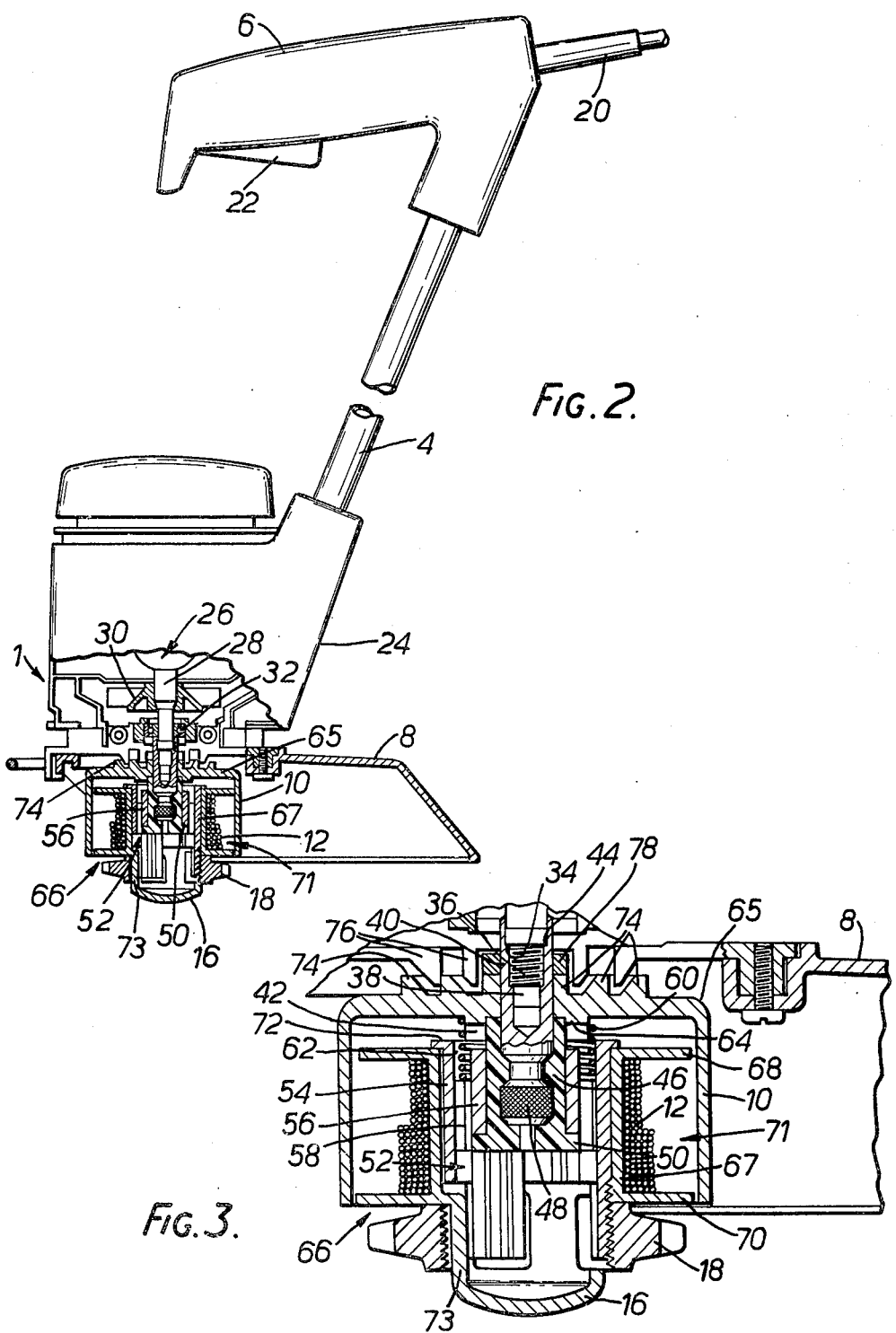

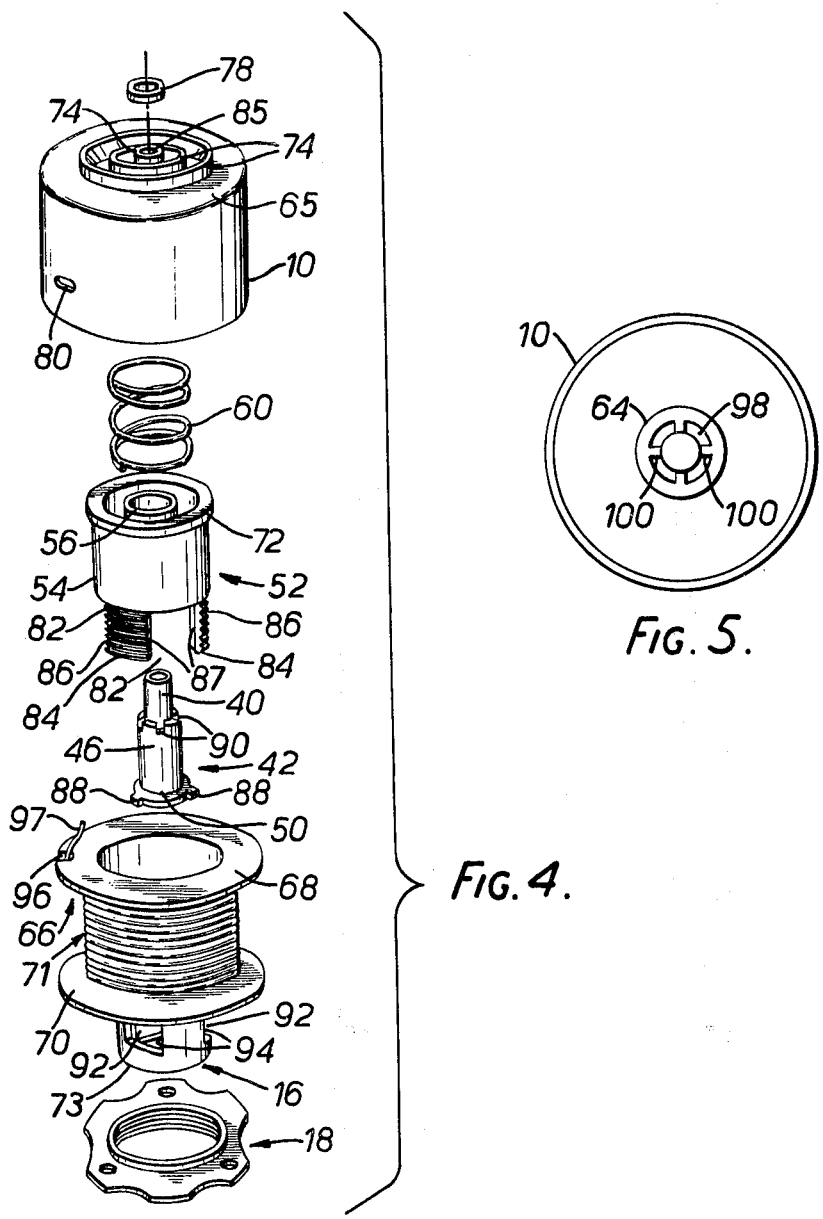

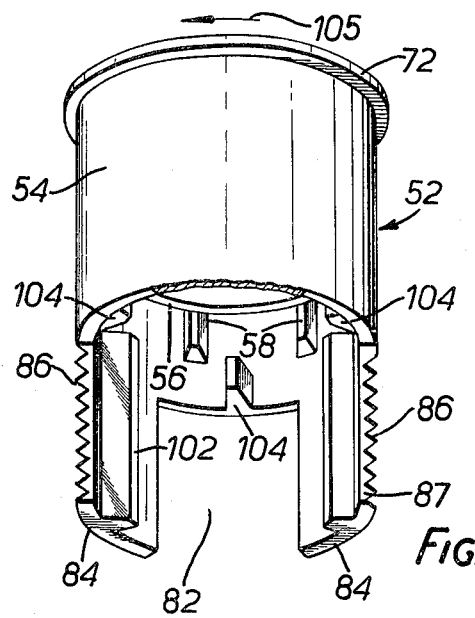
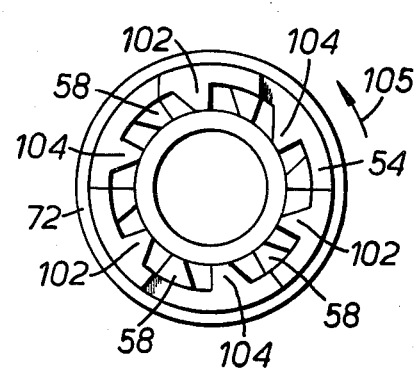
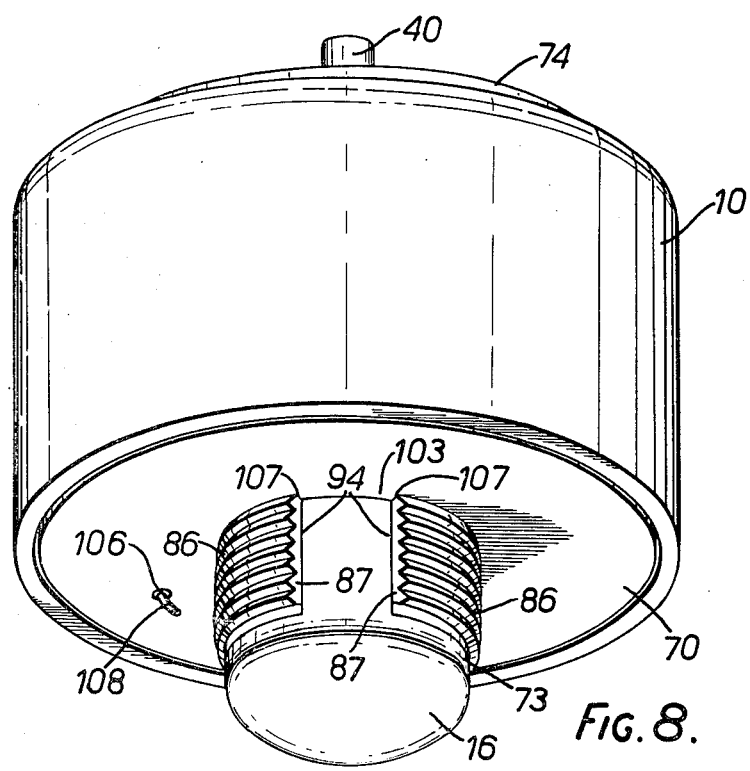

4,419,822

BUMP-FEED TRIMMER

FIELD OF THE INVENTION

The present invention relates to flexible filament vegetation cutting devices, and more particularly to bump-feed trimmers.

BACKGROUND OF THE INVENTION

Flexible filament vegetation cutting devices are known in which a coil of flexible cutting element is wound on a spool which is rotated about a substantially vertical axis to cause a free end of the cutting element to define a cutting plane. Such devices have been further developed into bump-feed trimmers.

A bump-feed trimmer is disclosed in United Kingdom Pat. No. 1,574,382 of The Toro Company. This discloses an escapement mechanism comprising two discs having inwardly projecting teeth and being sandwiched together and secured to a filament spool with the aid of a plurality of screws to define a spool assembly. The spool assembly is resiliently urged downwardly in a housing by a coil spring. Movement of the spool assembly axially relative to a drive member causes the spool assembly to be temporarily disconnected therefrom with the result that a discrete increment of filament unwinds from the spool. This operation is performed in use by "bumping" the trimmer head on the ground.

However, with the above disclosed bump-feed trimmer, the mechanism of the trimmer head is somewhat complicated to assemble. Also, the complete trimmer head has to be removed in order to replenish the supply of cutting filament or string.

SUMMARY OF THE INVENTION

It is, therefore, an object of the present invention to simplify the assembly of the trimmer head in a bump-feed trimmer.

It is a further object of the present invention to enable the supply of cutting filament or string to be replenished simply and quickly.

It is yet a further object of the present invention to provide a trimmer head for a bump-feed trimmer which has fewer parts to assemble.

It is yet another object of the present invention to provide an arrangement whereby the filament spool can readily be removed from the trimmer head.

It is still a further object of the present invention to provide an arrangement whereby the filament spool is quickly and easily removed from and replaced in a trimmer head, and yet the spool is positively rotated in use without any rotational slippage occurring.

Towards the accomplishment of the aforementioned objects and others which will become apparent from the following description and accompanying drawings, there is disclosed in a bump-feed monofilament string trimmer or the like, an escapement member retained against total withdrawal from the housing of the trimmer and nested within a spool member. The escapement member has a portion thereof extending beyond the spool member for engagement with a locking member, whereby a unitary sub-assembly is provided that may be manually retracted within the trimmer housing against the force of resilient biasing means, and whereby the locking member may be manually released to remove the spool member from the trimmer housing in order to replenish the monofilament string.

A rotatable drive member is connected to a source of motive power and nested within the escapement member. The escapement member is axially slidable along the drive member. Cooperating shoulder means between the drive member and the escapement member prevent total axial disengagement of the unitary subassembly with respect to the drive member. Cooperating clutch means interact between the drive member and the escapement member, whereby whenever the unitary subassembly is retracted within the housing against the bias force of the resilient means, the cooperating clutch means temporarily disengages and allows a predetermined length of the monofilament line to feed out of the spool member.

According to another aspect of the present invention there is provided a bump-feed trimmer or the like, comprising spool meas for holding a coil of flexible cutting element, said spool means being rotatable about a substantially vertical axis to cause a free end of the cutting element to define a cutting plane, and said spool means having a central protrusion extending downwardly from the lower side thereof. The central protrusion has a circumferential side wall with a plurality of slots therein. An escapement mechanism, for letting out discrete lengths of the cutting element, comprises an escapement member and a drive member disposed within said escapement member for rotationally driving the latter. Said escapement member has a plurality of axially extending fingers, and is nested in the spool means with the fingers axially penetrating said slots, with edge portions of the fingers engaging edge surfaces of the slots, whereby said spool means is arranged to be positively driven by the escapement member. Locking means releasably secure said spool means to the escapement member. The fingers may have external screw-threaded portions which are engageable by said locking means.

The escapement member may comprise a sleeve-like member with two series of internally projecting clutch teeth, one series being disposed at a lower level than the other. The drive member may have the driving teeth which normally drivingly engage said other upper series of clutch teeth, but temporarily engage said one lower series of clutch teeth upon temporary upward axial displacement of the spool means and escapement member relative to said drive member, whereby said escapement mechanism is actuated.

A housing may enclose the spool means and may have an open lower end defined by a lower peripheral edge, and a flexible closure may have a central opening therein through which said central protrusion may extend. The flexible closure may be secured against the underside of the spool means by said locking means, and be arranged to cover said peripheral edge. The flexible closure may be resilient and form resilient means urging the escapement member and the spool means downwardly.

The present invention also provides a trimmer head for a bump-feed trimmer or the like, comprising a filament holder having a central portion protruding downwardly from the lower side thereof, the central portion having a circumferential wall with a plurality of apertures therein; and an escapement member having a circumferential wall with a plurality of external screw-threaded sections thereon, the escapement member being nested in said central portion with the screw-threaded sections exposed outwardly through said apertures.

The present invention further provides a spool member for use in a bump feed string trimmer, comprising a cylindrical sleeve defining a central axis and having an outwardly extending flange at each end to define an annular compartment for a coil of flexible cutting element. A dome-like protrusion may extend axially and centrally from one of the flanges on the opposite side thereof to said sleeve and have a cylindrical side wall coaxial with said sleeve. The cylindrical side wall has an outside diameter smaller than the internal diameter of said cylindrical sleeve, and said cylindrical side wall has a plurality of window-like slots therein, each slot extending axially from said one flange.

BRIEF DESCRIPTION OF THE DRAWINGS

In the accompanying drawings:

FIG. 2 is a slide elevational view of the bump-feed trimmer, partially shown in section on the line 2—2 in FIG. 1;

FIG. 3 is a portion of the sectioned part of FIG. 2 on a larger scale;

FIG. 4 is is a diagrammatic exploded perspective view of the trimmer head shown in FIG. 3;

FIG. 5 is a plan view, from underneath, of the cover of the trimmer head;

FIG. 6 is a bottom perspective view of the escapement member with a portion cut away to show part of the interior;

FIG. 7 is a plan view of the escapement member of FIG. 6 as seen from the bottom end thereof;

FIG. 8 is a diagrammatic perspective view of the trimmer head as viewed from below, with a part removed for clarity;

DESCRIPTION OF PREFERRED EMBODIMENTS

Figure 1:
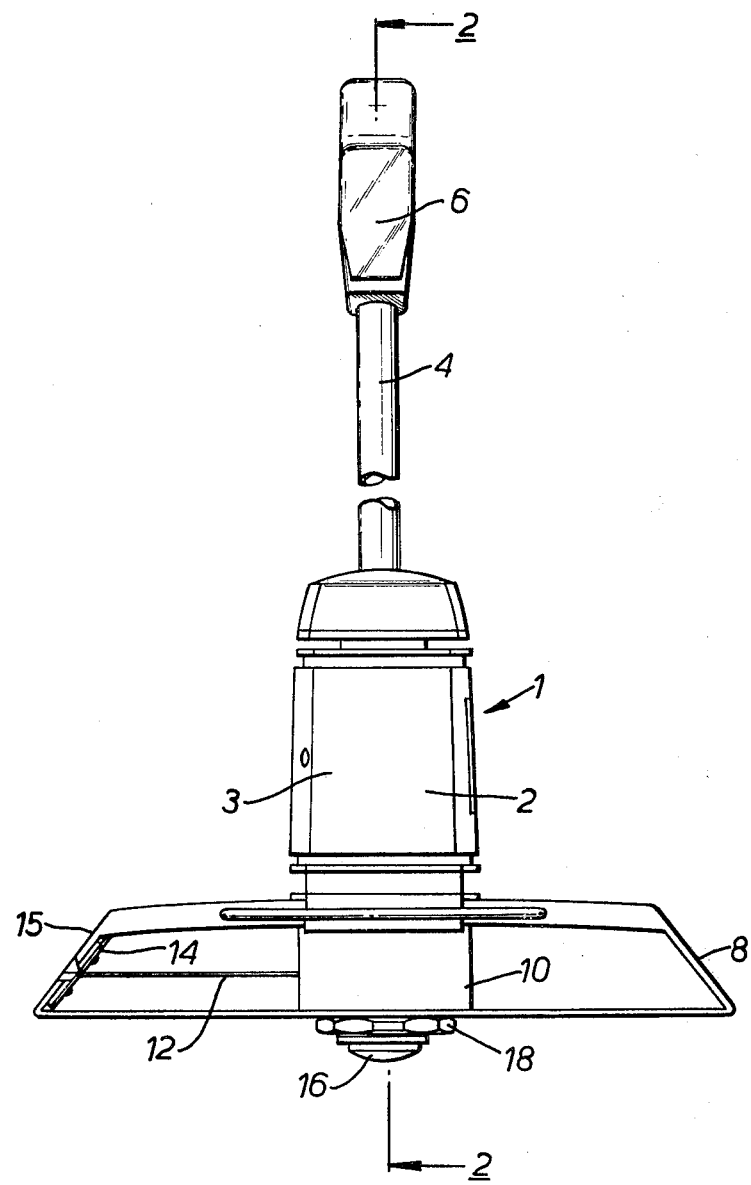
FIG. 1 shows a front elevational view of a bump-feed trimmer according to the present invention.

FIG. 1 shows a front view of a bump-feed monofilament string trimmer having a motor housing 1 formed by right and left housing halves 2 and 3, respectively. Extending upwardly from the rear of the motor housing 1 is a handle extension 4 having an operator handle 6. Below the motor housing 1 is a guard housing 8 which is open at the front and extends rearwardly of the motor housing 1. A rotatable trimmer housing 10 contains and forms part of a trimmer head having a supply of monofilament string or line 12 which, in use, extends horizontally from the trimmer housing 10 as the latter is drivingly rotated so that the extended flexible cutting filament 12 defines a cutting plane. A knife blade cutter 14, attached to the front of a side wall 15 of the guard housing 8, cuts any excess length off the extended filament 12 as the latter is rotated. A dome-shaped portion 16 of the trimmer head extends below the trimmer housing 10 and guard housing 8. A locking member in the form of an internally threaded nut 18 releasably retains the supply of cutting filament 12 in the trimmer head, as will be explained more fully later.

FIG. 2 shows a side view of the bump-feed trimmer with the trimmer head and adjacent parts shown in section on the line 2—2 of FIG. 1. An electric cable 20 extends rearwardly from the operator handle 6 and is adapted to be connected to a source of electrical supply. A pivoted lever 22 in the handle 6 is actuated by an operator to switch the bump-feed trimmer on and off. The handle extension 4 is secured in a rearward extension 24 of the motor housing 1. An electrical motor 26 is mounted in the motor housing 1 in clamshell fashion between the two motor housing halves. An armature shaft 28 extends vertically downwardly from the motor 26 through a sleeve bearing 30 and a ball bearing 32, and terminates in a screw-threaded end 36 of reduced diameter having a shoulder 34.

FIG. 3, which is on a larger scale than FIG. 2 to more clearly show details in the section of the trimmer head in FIG. 2 shows a drive member 42 having a metal stem 40. The upper end of the stem 40 has an internally screw-threaded bore 38 by means of which the drive member 42 is securely screwed onto the end 36 of the armature shaft 28. A shoulder 44 adjacent the upper end of the bore 38 firmly abuts the shoulder 34 of the armature shaft 28. The drive member 42 has a plastic toothed head 46 molded around the lower end of the metal stem 40 and firmly secured to the stem 40 by means of a knurled head 48 at the lower end of the stem 40. The plastic head 46 of the drive member 42 has at its lower end an annular flange 50 which has four radial driving teeth extending therefrom (as will be described later with reference to FIG. 3). A sleeve-like escapement member 52, having an outer cylindrical wall 54 and a shorter inner concentric cylindrical wall 56, surrounds and engages the head 46 of the drive member 42. An upper series of clutch teeth 58 extend inwardly from the outer wall 54 and also serve to connect the inner wall 56 to the outer wall 54. Resilient means, in the form of a helical spring 60, has its lower end bearing against the upper ends of the clutch teeth 58 in an annular cavity 62 between the upper portions of the inner and outer walls 56 and 54. The upper end of the spring 60 is located by a boss 64 in the trimmer housing 10 and bears against the underside of the top 65 of the trimmer housing 10. Mounted on, and surrounding the escapement member 52, is a spool member 66 having a central cylindrical wall 67 from which extend outwardly an upper annular flange 68 and a lower annular flange 70 so defining an annular compartment containing a coil 71 of the cutting filament 12. The spool member 66 has integrally formed therewith the downwardly extending dome-shaped protrusion 16 which has a cylindrical side wall 73. The outer diameter of the cylindrical wall 73 is slightly smaller than the inside diameter of the spool wall 67, as can be detected on the lefthand side of FIG. 3. At the upper end of the escapement member 52, a flange 72 extends outwardly from the outer wall 54. The locking nut 18 firmly presses the spool member 66 against the flange 72, as will be explained more fully later. The spring 66 resiliently urges downwardly the unitary subassembly formed by the escapement member 52, spool means 66, and locking nut 18. Downward movement of this unitary subassembly is limited by the lower edge of the inner wall 56 of the scapement member 52 abutting the upper surface of the flange 50 of the drive member 42. These abutting surfaces constitute cooperating shoulder means between the drive member 42 and the escapement member 52. On the upper side of the top 65 of the trimmer housing 10 are three concentric annular ribs 74, between which engage two downwardly extending annular ribs 76 on the underside of the motor housing 1. As can be seen in FIG. 3, the inner surface of the two outer ribs 74 is chamfered, and the outer surface of the two ribs 76 is chamfered. The ribs 74 and 76 cooperate to resist lateral movement of the trimmer housing 10. A metal collar 78, which is a tight press fit on the metal stem 40, secures the trimmer housing 10 to the drive member 42, with the upper end of the plastic head 46 engaging inside the boss 64 against the underside of the top 65 of the trimmer housing 10.

FIG. 4 shows diagrammatically an exploded perspective view of the trimmer head with the parts in the same orientation as shown in FIG. 3, except for the trimmer housing 10 which has been rotated approximately 120 degrees anti-clockwise to show an orifice 80 through which, in use, the free end of the cutting filament 12 extends from the spool member 66. The escapement member 52 has three equispaced openings 82 in the lower part of the outer wall 54 to define three downwardly extending fingers 84. Only two such fingers 54 can be seen in FIG. 3 because of the angle of the view. The three fingers 84 are arcuate extensions of the wall 54, and are equi-spaced around the lower end of the wall 54. The external surface of each finger 84 is formed as a screw-threaded portion 86. The screw-threads in the three screw-threaded portions 86 are arranged so that the locking nut 18 can be screwed onto and around the three screw-threaded portions 86. Each side of each finger 84 is defined by an edge 87. The drive member 42 has three driving teeth 88 extending radially outwardly from the flange 50. Only two of the teeth 88 can be seen in FIG. 3 due to the angle of the view. The three teeth 88 are equispaced around the periphery of the flange 50. The upper end of the plastic head 56 has fur equi-spaced radial slots 90 (only three of which can be seen in FIG. 3). The spool member 66 has three equi-spaced window-like slots 92 formed in the side wall 73 of the dome-shaped protrusion 16. Each slot 92 extends from the lower flange 70 for about three-quarters of the axial length of the side wall 73. The slots 92 are formed with axial edge surfaces 94. Each slot 92 is slightly wider than each finger 84. To assemble the trimmer head, the drive member 42 is inserted upwardly through the escapement member 52 until the stem 40 and the upper part of the plastic head 46 protrude upwardly above the flange 72, the flange 50 contacting the lower end of the inner wall 56 and the inner wall 56 being a sliding fit on the plastic head 46. The lower end of the coil spring 60 is then inserted into the cavity between the inner wall 56 and the outer wall 54. This assembly is then inserted upwardly inside the trimmer housing 10 until the metal stem 40 protrudes upwardly through a bore 85 in the top of the trimmer housing 10. The collar 78 is then pressed onto the stem 40 until the slotted upper end of the plastic head 46 is drawn tightly against the underside of the top 65 of the trimmer housing 10. The escapement member 52 can be moved upwardly and downwardly for limited displacement on the drive member 42 under the influence of the spring 60. At this stage of assembly the metal stem 40 of the drive member 42 is screwed securely onto the end 36 of the armature shaft 28 (see FIG. 3). The spool member 66 is now moved upwardly into the trimmer housing 10, slidably engaging over the outer wall 54 of the escapement member 52 until the upper flange 68 contacts the shoulder 72. The escapement member 52 is now "nested" within the spool member 66. During this assembly of the spool member 66, the window-like slots 92 are aligned with the fingers 84 which axially engage in the slots 92. The edges 87 of the fingers 84 abut the edge surfaces 94 of the slots 92 to positively prevent relative rotation between the spool member 66 and the drive member 52. Also, the screw-threads of the screwthreaded portions 86 extend beyond the outer surface of the side wall 73 of the dome-like protrusion 16, due to the diameter of the outer surface of the side wall 73 being slightly less than the diameter of the inner surface of the wall 54 of the escapement member 52. The locking nut 18 is now engaged over the dome-like protrusion 16, and screwed finger-tight onto the screw-threaded portions 86 of the fingers 84 to secure the spool member 66 on the escapement member 52 with the upper flange 68 abutting and pressed against the shoulder 72. It will be appreciated that when an operator needs to replenish the supply of cutting filament, he simply has to unscrew the locking nut 18 with his fingers, slip the empty spool member 66 off the escapement member 52, insert a new full spool member over the escapement member 52, taking care to orientate the slot-like windows 92 and the fingers 84, and then replace the locking nut 18 and tighten it finger-tight. This is a very simple operation which can be effected quickly and without the use of any tools. With a replacement spool member, the outer free end 97 (see FIG. 4) of the cutting filament may be entrapped in a small peripheral slot 96 in the upper flange 68. Before mounting the replacement spool member 66 in the trimmer head, the free end 97 of the cutting filament is removed from the slot 96 and threaded through the orifice 80 in the trimmer housing 10.

FIG. 5 is an underneath plan view, on a different scale, of the trimmer housing 10, and shows the boss 64 formed on the underside of the top wall of the housing 10. The inner periphery of the boss 64 has an annular recess 98 into which extend four keys 100 formed integrally with the boss 64. During assembly of the trimmer head, the slots 90 (see FIG. 4) of the drive member 42 engage over the keys 100 to prevent relative rotation between the trimmer housing 10 and the drive member 42.

FIG. 6 shows a bottom perspective view, on a larger scale, of the escapement member 52, with one of the three fingers 84 broken away to more clearly disclose the inside of the escapement member 52. The upper series of clutch teeth 58, connecting the inner wall 56 to the outer wall 54, extend axially downward at their lower ends beyond the lower edge of the inner wall 56. Also, inwardly extending from the outer wall 54 is a lower series of clutch teeth formed by alternate long teeth 102 and short teeth 104. The upper and lower series of clutch teeth each have six teeth equi-spaced around the inner surface of the wall 5. The lower series of teeth 102,104 are equi-spaced between the upper series 58, with the lower ends of the teeth 58 and the upper ends of the teeth 102, 104 being in a common plane. In operation, the escapement member 52 rotates in the direction of the arrow 105, i.e., clockwise when looking down upon the top of the escapement member 52, and the trailing edges of all the teeth 58, 102, and 104 are radially disposed (see also FIG. 7).

FIG. 7 is an underneath plan view, on a different scale, of the escapement member 52 and shows more clearly the equispacing of the upper series of clutch teeth 58, the equispacing of the lower series of alternate clutch teeth 102 and 104, and the equispacing of the upper series of teeth 58 between the lower series of teeth 102, 104.

FIG. 8 shows diagrammatically a perspective view, on a larger scale, of the trimmer head as viewed from below, with the locking nut 18 omitted to show more clearly how the fingers of the escapement member engage in the window-like slots of the dome-like protrusion 16 to achieve position driving engagement therewith. The edges 87 of the fingers can be seen protruding outwardly beyond the edge surfaces 94 of the window-like slots. Thus, the externally screw-threaded portions 86 of the fingers extend radially outwardly through the window-like slots to enable them to be engaged by the locking nut. The side wall 73 is connected to the lower flange 70 of the spool member by three short radial arms 103, so defining three shallow arcuate recesses 107 between the side wall 73 and the inner periphery of the lower flange 70. The screw-threaded portions 86 of the fingers axially pass through the recesses 107 when the spool member is assembled onto the escapement member. This ensures positive driving engagement between the part of each edge 87 inward of its respective screw-threaded portion 86, and the outer part of the adjacent edge surface 94, whereby the escapement member 52 positively drives the spool member 66 without any possibility of rotational slippage therebetween. FIG. 8 also shows the inner free end 108 of the cutting filament 12 extending outwardly through a hole 106 in the flange 70 to anchor that end 108 with respect to the spool member.

In operation, the motor 26 rotates the trimmer head clockwise, when viewed from above, with the free end 12 of the cutting filament defining a cutting plane. Mainly referring to FIGS. 3, 4, and 6, the drive member 42 is rotated and axially located by the armature shaft 28. The driving teeth 88 of the drive member 42 drivingly engage the upper series of teeth 58 of the escapement member 52 thereby drivingly rotating the latter. The engagement of the teeth 88 and 58 is ensured by the bias force of the spring 60 urging the escapement member axially downwards with the inner wall 56 of the escapement member 52 being pressed against the flange 50 of the drive member 42. The escapement member 52 drivingly rotates the spool member 66 by the positive engagement of the fingers 84 in the window-like slots 92. The trimmer housing 10 is rotated by the drive member 42 with the slots 90 (see FIG. 4) engaging the keys 100 (see FIG. 5). During use, the free end 12 of the cutting filament becoms worn or broken and periodically requires replacement. When this is necessary, the dome-like protrusion 16 is pushed or retracted inwardly into the trimmer housing 10 against the action of the spring 60. This can be conveniently accomplished in use by "bumping" the dome-like protrusion 16 on the ground. This upward movement of the spool member 66 causes the escapement member 52 to slide upwardly on the drive member 42 so causing the driving teeth 88 of the drive member to slide axially out of engagement with the upper series of clutch teeth 58 and drivingly engage the lower series of clutch teeth 102, 104. When the upward pressure is removed from the dome-like protrusion 16, the spool member 66 is again returned downwardly by the spring 60 to the position shown in FIG. 3. During this downward movement of the spool member 66, the escapement member 52 slides downwardly over the drive member 42 and the driving teeth 88 axially disengage from the lower series of clutch teeth 102, 104 and again engage the upper series of clutch teeth 58. However, during this upward and downward cycle, the escapement member 52 rotates anticlockwise, when viewed from above, relative to the drive member 42 by an amount determined by the pitch between the clutch teeth 58. Put another way, the driving tooth 88 of the drive member 42 engaging the clutch tooth 58 on the lefthand side of FIG. 6 would engage the clutch tooth 104 in the center of FIG. 6 upon upward movement of the escapement member 52, and then would engage the clutch tooth 58 on the right in FIG. 6 upon the subsequent downward return movement of the escapement member 52. In this way, the upper series of teeth 58, the lower series of teeth 102, 104, and the driving teeth 88 form cooperating clutch means between the drive member 42 and the escapement member 52. Thus, each time the dome-like protrusion 16 is "bumped" on the ground, each driving tooth 88 moves forwardly to engage the next clutch tooth 58, so causing a discrete length of cutting filament to be let out from the spool member 66.

As will be appreciated, the entire trimmer head is made up of a minimal number of parts which reduces manufacturing costs and makes assembly exceedingly simple. The escapement member 52, the spool member 66, and the housing member 10 can readily be molded from plastics material. Also, the arrangement, according to the present invention, of mounting the spool member 66 onto the escapement member 52 enables an operator to readily replace an empty spool by unscrewing the single locking nut, removing the empty spool, and sliding a full replacement spool upon the escapement member. Thereafter, the user simply replaces the locking nut so that it is finger-tight.

Figure 9:
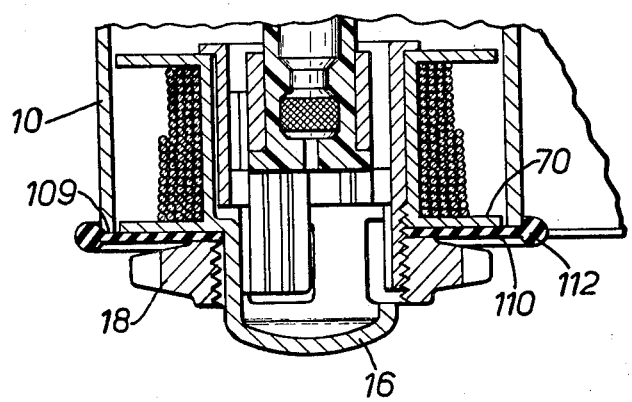
FIG. 9 diagrammatically shows a modification of the trimmer head.

FIG. 9 is a similar view to FIG. 3 of a modification of the trimmer head. A protective annular flexible disc 110 is mounted on the dome-like protrusion 16 and held in place by the locking nut 18. The outer peripheral portion of the protective disc 110 contacts the lower edge 109 of the side wall of the trimmer housing 10. The outer periphery of the disc 110 has an outer rim 112 in the form of a thickened portion of somewhat circular cross-section. The thickened rim 112 engages the lower outside surface of the trimmer housing 10. In this way, the flexible disc 110 covers the annulus conjointly defined by the lower edge 109 of the trimmer housing side wall and the outer periphery of the lower flange 70 of the spool. Thus, any ingress of lawn and garden debris, especially dirt, fine gravel, sand, and grass clippings and the like, through that annulus into the trimmer housing is prevented. This is particularly important during movement of the spool member inwardly and outwardly relative to the trimmer housing 10. If such debris were allowed continued and unrestricted access, it could seriously impair the operation of the escapement mechanism by jamming or blocking such movement. The rim 112 serves two functions. Firstly, it retains the periphery of the disc 110 in contact with the trimmer housing 10 during inward and outward movement of the dome-like protrusion 16. Secondly, its shape has been chosen so that on the lower side there is no tendency for debris to get trapped or hung up by the rim 112, but instead the rim profile aids "flinging" the debris clear and not allowing it to build up. The disc 110 is made from lightweight, resilient material, resistant to conditions found in the garden (e.g. chemical contact, grass staining etc.), preferably low density polyethylene or ethylene-vinyl-acetate.

Figure 10:
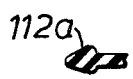
FIGS. 10 and 11 are diagrammatic fragmentary views showing further modifications of the modified trimmer head of FIG. 9.

FIG. 10 shows, in fragmentary view, an alternative profile 112a for the rim 112.

Figure 11:

FIG. 11 is a similar view to FIG. 10 showing yet another profile 112b for the rim 112. As explained in relation to FIG. 9, the alternative rim profiles 112a and 112b have been chosen to perform the two functions of retaining the rim in contact with the trimmer housing 10, and allowing dirt and cuttings to be readily thrown clear of the rim from the underside of the protective disc.

In a further modification, the protective disc 110 can be made of a plastics material with a suitably chosen flexural modulus so that the protective disc 110 resiliently resists upward movement of the spool member 66. With this modification the spring 60 can be eliminated, and the protective disc can function as resilient means yieldably allowing upward movement of the spool member 66 during "bumping" and returning the spool member downwards thereafter.

The above described embodiments, of course, are not to be construed as limiting the breadth of the present invention. Modifications, and other alternative constructions, will be apparent which are within the spirit and scope of the invention as defined in the appended claims.

I claim:

1. A bump-feed monofilament string trimmer or the like, comprising:
   a trimmer housing;
   a spool member for holding a coil of monofilament string;
   an escapement member retained against total withdrawal from the trimmer housing and nested within the spool member with a portion of the escapement member extending beyond the spool member;
   a locking member engaging said extending portion of the escapement member whereby a unitary sub-assembly is formed by the spool, escapement and locking members;
   resilient means for biasing said sub-assembly outwardly of the trimmer housing, said sub-assembly being manually retractable within the trimmer housing against the force of said resilient means; and
   whereby the locking member can be manually released to remove the spool member from the housing in order to replenish the monofilament string.

2. The bump-feed monofilament string trimmer or the like claimed in claim 1 wherein a rotatable drive member is located within the escapement member for drivingly rotating the latter, retraction of said sub-assembly within the trimmer housing effecting relative movement between the escapement and drive members.

3. The bump-feed monofilament string trimmer or the like claimed in claim 2, wherein the drive member retains the escapement member against withdrawal from the trimmer housing when the locking member is released and the spool member is removed.

4. A bump-feed trimmer or the like, comprising:
   a source of motive power;
   a trimmer housing;
   a spool member, for holding a supply of monofilament line, mounted in the trimmer housing;
   an escapement member nested within the spool member;
   manually-releasable means for securing the spool member to the escapment member to form a unitary subassembly;
   a rotatable drive member connected to the source of motive power for rotation thereby, and nested within the escapement member, the escapement member being axially slidable along the drive member;
   cooperating shoulder means, between the drive member and the escapement member, for preventing total axial disengagement of said unitary sub-assembly with respect to the drive member;
   resilient means urging said unitary sub-assembly in a direction outwardly of the trimmer housing;
   cooperating clutch means, between the drive member and the escapement member, for drivingly connecting the drive member to the escapement member; and
   the escapement member having a portion extending beyond the spool member, and said manually releasable means engaging said portion externally of the spool member;
   whereby whenever said unitary sub-assembly is retracted within the trimmer housing against the bias force of the resilient means, the cooperating clutch means temporarily disengages and allows a predetermined length of the monofilament line to feed out of the spool member.

5. The bump-feed trimmer or the like claimed in claim 4, wherein said portion comprises a plurality of axially extending finger-like members externally screw-threaded, the spool member having apertures therein through which said finger-like members drivingly engage, and the manually-releasable means comprises an internally screw-threaded member engaging the external screw-threads of said finger-like members.

6. A bump-feed trimmer or the like, comprising:
   spool means for holding a coil of flexible cutting element, said spool means being rotatable about a substantially vertical axis to cause a free end of the cutting element to define a cutting lane, and said spool means having a central protrusion extending downwardly therefrom;
   said protrusion having a circumferential side wall with a plurality of slots therein;
   an escapement mechanism, for letting out discrete lengths of the cutting element, comprising an escapement member and a drive member disposed within said escapement member for rotationally driving the latter;
   said escapement member having a plurality of axially extending fingers, and being nested in said spool means with said fingers axially penetrating said slots with edge portions of said fingers engaging edge surfaces of said slots, whereby said spool means is arranged to be positively driven by said escapement member;
   locking means releasably securing said spool means to said escapement member; and
   said fingers having external screw-threaded portions which are engaged by said locking means.

7. The bump-feed trimmer or the like claimed in claim 6, wherein said locking means comprises an internally threaded nut.

8. The bump-feed trimmer or the like claimed in claim 6, wherein said escapement member and said spool means are axially movable relative to said drive member; and further comprising resilient means urging said escapement member and said spool means axially downwardly.

9. A bump-feed trimmer or the like, comprising:
   spool means for holding a coil of flexible cutting element, said spool means being rotatable about a substantially vertical axis to cause a free end of the cutting element to define a cutting plane, and said spool means having a central protrusion extending downwardly therefrom;

said protrusion having a circumferential side wall with a plurality of slots therein;

an escapement mechanism, for letting out discrete lengths of the cutting element, comprising an escapement member and a drive member disposed within said escapement member for rotationally driving the latter;

said escapement member having a plurality of axially extending fingers, and being nested in said spool means with said fingers axially penetrating said slots with edge portions of said fingers engaging edge surfaces of said slots, whereby said spool means is arranged to be positively driven by said escapement member;

locking means releasably securing said spool means to said escapement member;

said escapement member and said spool means being axially movable relative to said drive member;

resilient means urging said escapement member and said spool means axially downwardly; and said escapement member comprising a sleeve-like member with two series of internally projecting clutch teeth, one series being disposed at a lower level than the other, and said drive member having driving teeth which normally drivingly engage the upper series of clutch teeth but temporarily engage the lower series of clutch teeth upon temporary upward axial displacement of said spool means and said escapement member relative to said drive member, whereby said escapement mechanism is actuated.

10. The bump-feed trimmer or the like claimed in claim 9, wherein said sleeve-like member has an outer cylindrical wall from which said clutch teeth project, and an inner concentric cylindrical wall defining a bore; and said rive member has a lower flange and is slidably mounted in said bore; and said resilient means urges the lower end of said inner wall to contact said lower flange thereby determining the normal relative axial positions of said escapement member and said drive member.

11. A bump-feed trimmer or the like, comprising:

spool means for holding a coil of flexible cutting element, said spool means being rotatable about a substantially vertical axis to cause a free end of the cutting element to define a cutting plane, and said spool means having a central protrusion extending downwardly therefrom;

said protrusion having a circumferential side wall with a plurality of slots therein;

an escapement mechanism, for letting out discrete lengths of the cutting element, comprising an escapement member and a drive member disposed within said escapement member for rotationally driving the latter;

said escapement member having a plurality of axially extending fingers, and being nested in said spool means with said fingers axially penetrating said slots with edge portions of said fingers engaging edge surfaces of said slots, whereby said spool means is arranged to be positively driven by said escapement member;

locking means releasably secured said spool means to said escapement member;

said escapement member and said spool means being axially movable relative to said drive member;

resilient means urging said escapement member and said spool means axially downwardly;

a trimmer housing enclosing said spool means and having an open lower end defined by a lower peripheral edge; and a flexible closure having a central opening therein through which said central protrusion extends, said flexible closure being secured against the underside of said spool means by said locking means and covering said peripheral edge.

12. The bump-feed trimmer or the like claimed in claim 11, wherein said flexible closure resiliently resists upward movement of said spool means and forms said resilient means urging said escapement member and spool means downwardly.

13. The bump-feed trimmer or the like claimed in claim 12, wherein said flexible closure has a peripheral portion of thicker cross-section which encircles the outside of said lower peripheral edge.

14. A bump-feed trimmer or the like, comprising:

spool means for holding a coil of flexible cutting element, said spool means being rotatable about a substantially vertical axis to cause a free end of the cutting element to define a cutting plane, and said spool means having a central protrusion extending downwardly therefrom;

said protrusion having a circumferential side wall with a plurality of slots therein;

an escapement mechanism, for letting out discrete lengths of the cutting element, comprising an escapement member and a drive member disposed within said escapement member for rotationally driven the latter;

said escapement member having a plurality of axially extending fingers, and being nested in said spool means with said fingers axially penetrating said slots with edge portions of said fingers engaging edge surfaces of said slots, whereby said spool means is arranged to be positively driven by said escapement member;

locking means releasably securing said spool means to said escapement member; and said central protrusion having three said slots and said escapement member having three said fingers.

15. A trimmer head, for a bump-feed trimmer or the like, comprising:

a filament holder for holding a coil of flexible cutting filament, said filament holder being adapted for rotation about a substantially vertical axis to cause a free end of the cutting filament to define a cutting plane, and said filament holder having a central portion protruding downwardly from the lower side thereof, said central portion having a circumferential wall with a plurality of apertures therein;

an escapement mechanism for letting out from said filament holder discrete lengths of the cutting filament and having an escapement member rotatable with said filament holder, said escapement member having a circumferential wall with a plurality of external screw-threaded sections thereon, said escapement member being nested in said central portion with said screw-threaded sections exposed outwardly thrugh said apertures; and, internally threaded locking means, screwed onto said screw-threaded sections, for releasaly securing said filament holder to said escapement member.

16. A cutting element holder, for use in a bump-feed string trimmer or the like, comprising:

a cylindrical sleeve defining a central axis and having an outwardly extending flange at each end thereof to define an annular compartment;

a coil of flexible cutting element wound in said annular compartment;

a dome-like protrusion extending axially and centrally from one of the flanges on the opposite side thereof to said sleeve and having a cylindrical side wall coaxial with said sleeve;

said cylindrical side wall having an outside diameter smaller than the internal diameter of said cylindrical sleeve;

said one flange having a plurality of inwardly extending radial arms with the inner ends of said arm connected to said side wall, said arms defining recesses therebetween with said recesses extending into said one flange radially outwardly of said side wall; and said side wall having a plurality of window-like slots therein formed completely through said side wall from the inside to the outside thereof, said slots communicating with said recesses and extending completely through said side ball axially from said recesses;

whereby in use said cutting element holder is slidably and releasably mounted on a sleeve-like escapement member of a bump-feed string trimmer in which the escapement member has externally threaded axial fingers adapted to slidably engage through said recesses into said slots with externally threaded portions of said fingers disposed radially outwardly of said side wall for engagement by a locking nut encircling the outside of said side wall.

17. The cutting element holder claimed in claim 16, wherein said side wall has three equi-spaced window-like slots therein.

* * * * *